United States Patent [19]

Farber et al.

[11] Patent Number: 6,105,124

[45] Date of Patent: *Aug. 15, 2000

[54] METHOD AND APPARATUS FOR MERGING BINARY TRANSLATED BASIC BLOCKS OF INSTRUCTIONS

[75] Inventors: Yaron Farber; Gad Sheaffer, both of Haifa; Robert Valentine, Airyat Tivon, all of Israel

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/672,100

[22] Filed: Jun. 27, 1996

Related U.S. Application Data

[63] Continuation-in-part of application No. 08/592,761, Jan. 26, 1996, abandoned.

[51] Int. Cl.[7] .................................................... G06F 9/30
[52] U.S. Cl. .......................... 712/208; 712/214; 395/705
[58] Field of Search ........................... 395/705, 706, 395/709; 712/215, 216, 204, 205, 210, 208, 41, 214, 209

[56] References Cited

U.S. PATENT DOCUMENTS

| | | | |
|---|---|---|---|
| 4,370,711 | 1/1983 | Smith | 395/587 |
| 4,992,934 | 2/1991 | Portanova et al. | 712/209 |
| 5,438,668 | 8/1995 | Coon et al. | 712/204 |
| 5,442,760 | 8/1995 | Rustad et al. | 395/391 |
| 5,507,028 | 4/1996 | Liu | 395/383 |
| 5,557,761 | 9/1996 | Chan et al. | 395/709 |
| 5,560,013 | 9/1996 | Scalzi et al. | 395/705 |
| 5,598,546 | 1/1997 | Blomgren | 395/385 |
| 5,699,536 | 12/1997 | Hopkins et al. | 712/216 |

OTHER PUBLICATIONS

M. Johnson, "Superscalar Microprocessor Design", Prentice–Hall 1991, p. 203–207.

*Primary Examiner*—Viet D. Vu
*Attorney, Agent, or Firm*—Blakely, Sokoloff, Taylor & Zafman LLP

[57] ABSTRACT

A method for merging binary translated basic blocks of instructions. The method is for use in a computer system having in a memory a first set of instructions including blocks of instructions, and a translator for translating instructions executable on a source instruction set architecture into instructions executable on a target instruction set architecture. The method includes a first step of determining, by the translator, an order of execution from a first block of instructions to a second block of instructions. A second step of the method includes generating, by the translator, a hyperblock of instructions representing the first and second block of instructions translated and placed adjacent in a memory location in the order of execution.

17 Claims, 3 Drawing Sheets

METHOD AND APPARATUS FOR MERGING BINARY TRANSLATED BASIC BLOCKS OF INSTRUCTIONS

CROSS-REFERENCE TO RELATED APPLICATION

This patent application is a Continuation-in-Part of application Ser. No. 08/592,761, Titled "Trace-Based Merging Of Code Blocks To Facilitate Code Optimization In Binary Translation", Filed Jan. 26, 1996, by Yaron Farber, Gad Sheaffer, and Robert Valentine, now abandoned.

BACKGROUND OF THE INVENTION

1. Field of the Invention

The invention relates to computer systems, and in particular, the generation of fast, optimized code by merging binary translated basic blocks of instructions.

2. Description of Related Art

Each computer architecture includes its own unique instruction set. Computer program instructions that are compiled into executable code for a first source instruction set architecture, such as the Intel® X86, may undergo a binary translation in order to be compatible with a different target instruction set architecture, such as a reduced instruction-set computer (RISC) or very long instruction word (VLIW) computer architecture.

The translation may be performed by a dynamic translator typically stored in memory. During dynamic translation, instructions are typically translated one basic block of instructions (BB) at a time, and stored in memory at an area allocated for storing translated BBs, such as the Translated Basic Blocks memory location 160, shown in the memory of FIG. 1. Each basic block of instructions includes a contiguous sequence of non-branch instructions (i.e. do not change order of executing instructions) which typically ends with a conditional branch instruction.

An untranslated computer program, such as the Source Program 110 of FIG. 1, consist of several BB's stored in a physical static sequence (e.g., $BB_1, BB_2, BB_3 \ldots BB_{10}$). The order of executing the BB's can be different from the static sequence. The order of executing the BB's is determined by the behavior of the BB's branch instructions.

For example, if the branch instructions of $BB_1$ and $BB_4$ are the only branch instructions taken in the Source Program 110 (i.e. the branch instruction of $BB_3$ is not taken), the order of execution is $BB_1$-$BB_3$-$BB_4$-$BB_{10}$. In the order of Execution, $BB_1$ and $BB_3$, as well as $BB_4$ and $BB_{10}$, remain separated in the physical static sequence of the program.

After a BB has been translated, the translated BB is stored in memory. However, the translated BB's may not be stored in the order of the original static sequence of the untranslated Basic Blocks of instructions. Therefore, when executing a translated BB additional time maybe needed to locate the memory address of the translated BB.

In addition, after a BB has been translated, the instructions of the BB are typically rescheduled to accommodate resource and data dependencies among the instructions within the BB. The rescheduling becomes more effective as the number of instructions rescheduled increases. The rescheduling, however, is typically limited to the instructions within one BB, which typically only consist of five to ten instructions.

SUMMARY OF THE INVENTION

The present invention provides a method for use in a computer system. The computer system has in a memory a first set of instructions including blocks of instructions, and a translator for translating instructions executable on a source instruction set architecture into instructions executable on a target instruction set architecture. The method includes a first step of determining, by the translator, an order of execution from a first block of instructions to a second block of instructions. A second step of the method includes generating, by the translator, a hyperblock of instructions representing the first and second block of instructions translated and placed adjacent in a memory location in the order of execution.

DETAILED DESCRIPTION OF THE PRESENT INVENTION

A method is described for merging several translated basic blocks of instructions into a hyperblock of instructions in an order of execution.

Figure 1:
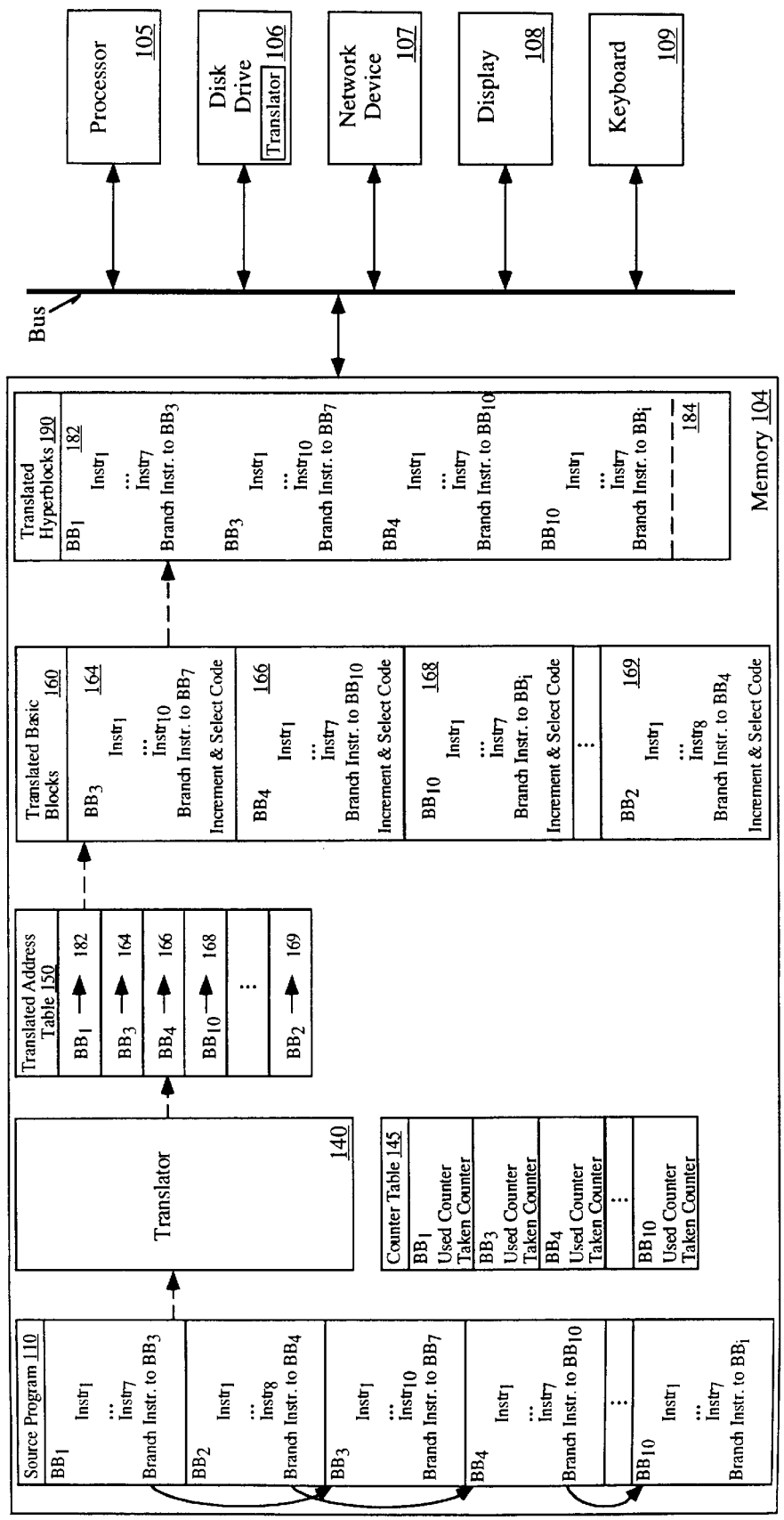
FIG. 1 illustrates a computer system on which the present invention can be implemented.

Referring to FIG. 1, a target instruction set computer architecture is shown implementing one embodiment of the present invention. Shown stored in the memory is the untranslated Source Program 110, consisting of several BB's executable on a source instruction set computer architecture. The BB's of the untranslated Source Program are to be translated by the Translator in order to be executed in the target instruction set computer architecture.

After the BB's of the Source Program are translated, the BB's are stored in the area of memory shown as the Translated Basic Blocks 160. The memory address for each translated BB is stored in the Translated Address Table 150.

In one embodiment, each translated BB has associated with it two counters (i.e. a used counter and a taken counter). The counters record the branch behavior patterns of the translated basic blocks of instructions in order to determine an "expected" order of execution based on input data presently being processed. In an alternative embodiment, the order of execution can be based on assuming all forward conditional branch instructions or all backward conditional branch instructions are taken.

The used counter represents the number of times a particular translated basic block of instructions has been executed during the present execution a computer program on the target computer. The taken counter represents the number of times the branch instruction of the translated BB has been taken during the present execution of the computer program. The counter for each translated BB is stored in the Counter Table 145 shown in the memory.

In one embodiment of the present invention, several translated basic blocks of instructions are merged into one basic block of instructions, in an order of execution, to form a hyperblock instructions. The hyperblock of instructions is then stored in an area of memory, such as the Translated Hyperblocks 190 memory area shown in FIG. 1.

Figure 2A:
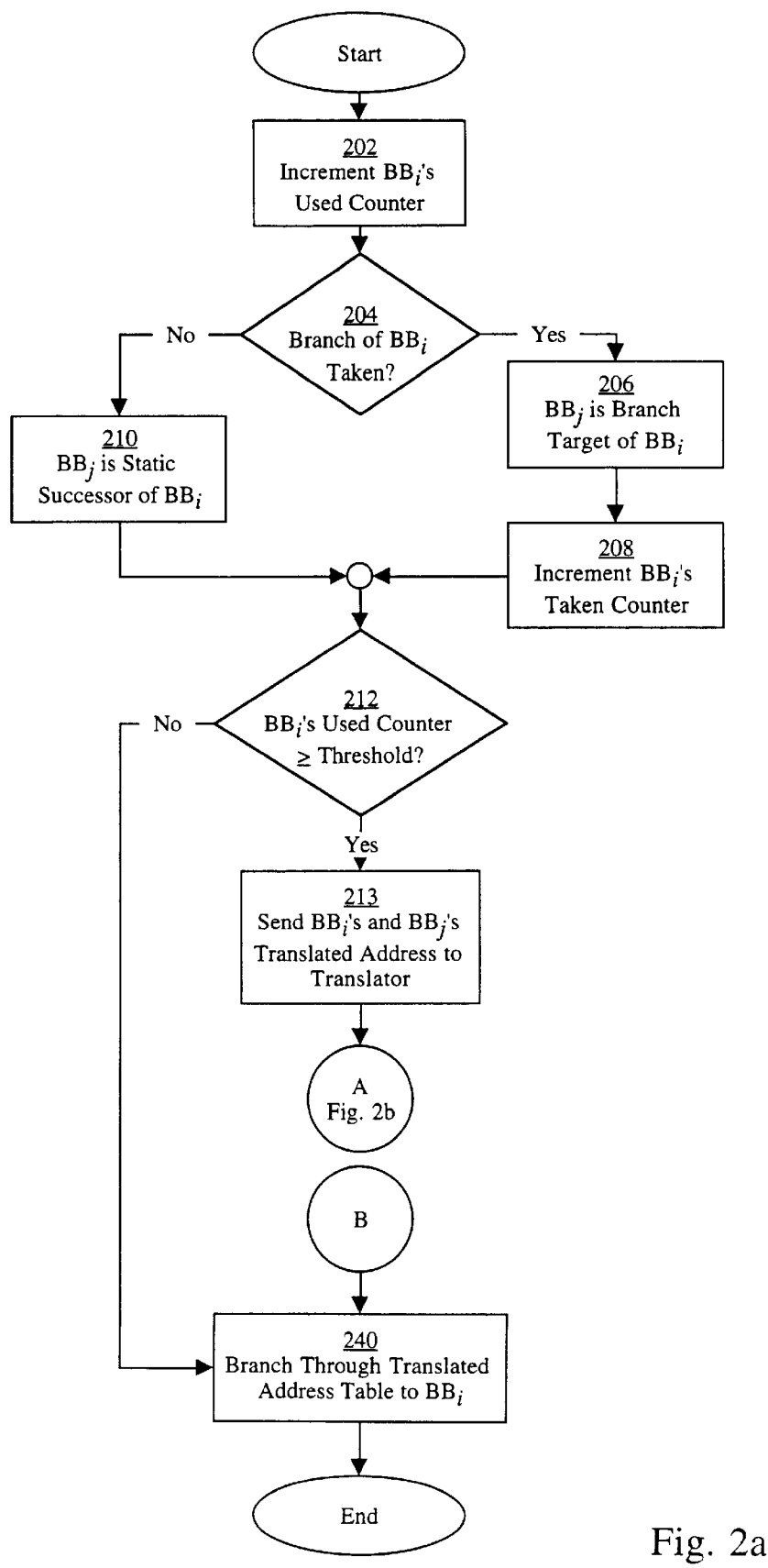
FIG. 2a is a flow diagram of the steps performed in the method of the present invention.
Figure 2B:
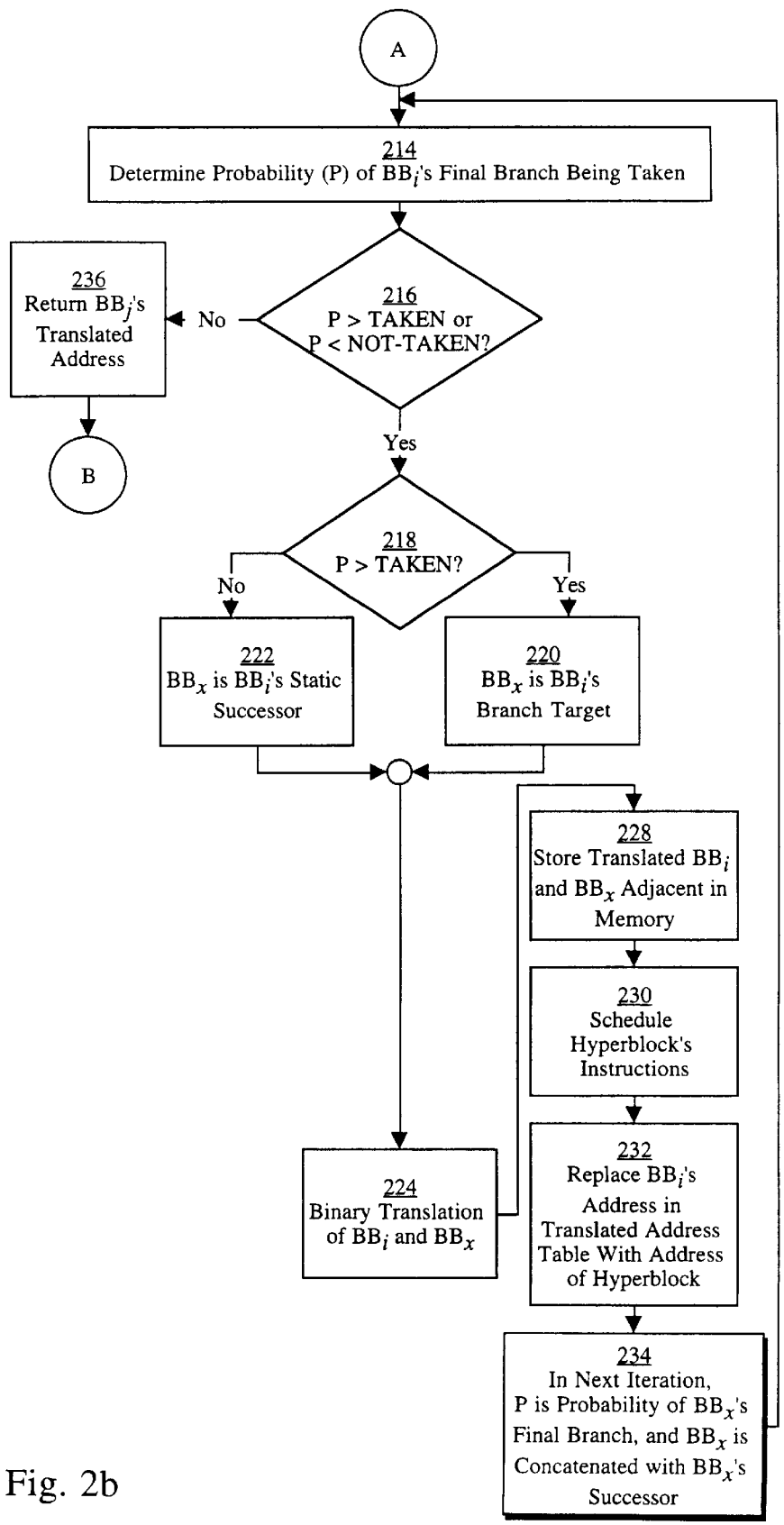
FIG. 2b is a flow diagram of the steps performed in the method of the present invention, wherein the merging of translated basic blocks of instruction is performed.

Referring to FIGS. 2a and 2b, flow diagrams are shown illustrating the steps performed in one embodiment of the present invention to generate a hyperblock of instructions. In FIG. 2a, $BB_i$, which hereinafter represents the current BB, has been translated and executed at least once on the target computer prior to block 202. Following the execution, in block 202 the used counter of $BB_i$ is incremented.

The counters are incremented by code in the respective translated BB (Increment & Select Code) which is appended to each BB during the binary translation of each BB. The Increment & Select Code includes instructions to load the respective counter from a Counter Table 145 in memory, increment it by 1, and store it back in memory. In alternative embodiments, the counters could be stored in memory in alternative data structures, such as a B-tree data structure.

Also, in an alternative embodiments, the Increment & Select Code could be represented by a procedure call to a separate procedure in the respective computer program or included in the Translator.

In conditional block 204, it is determined whether the conditional branch instruction of $BB_i$ as taken. If the branch instruction of $BB_i$ was taken, in block 206, $BB_j$ (which hereinafter represents the BB that follows $BB_i$ in the order of execution) is the BB addressed by the branch instruction of $BB_i$. In block 208, $BB_i$'s taken counter is incremented. Otherwise, if the branch instruction of $BB_i$ was not taken, in block 210, $BB_j$ is the next sequential block in the static sequence of the program.

In conditional block 212, it is determined by $BB_i$'s Increment & Select Code, whether $BB_i$'s used counter is greater than or equal to a predetermined used-threshold, also stored in the Increment & Select Code. If the used counter of $BB_i$ is equal to or exceeds the used-counter threshold, the present invention begins forming a hyperblock between $BB_i$ and the BB most likely to follow $BB_i$ in the order of execution (hereinafter represented as $BB_x$).

In one embodiment, the used counter threshold is 100. The actual number of the used counter threshold can be different in alternative embodiments.

If $BB_i$'s used counter is below the used-threshold, in block 240, the program will continue execution at $BB_j$. If the instructions of the $BB_j$ have already undergone a binary translation, then the memory address for the translated $BB_j$ can be obtained from a Translated Address Table in memory 104. Otherwise, $BB_j$ is translated by the Translator and the address of the translated $BB_j$ is stored in the Translated Address Table.

If the used counter of $BB_i$ is equal to or exceeds the used counter threshold, in block 213 the translated addresses for $BB_i$ and $BB_j$ are sent to Translator. As illustrated in the flow diagram of FIG. 2b, the Translator begins forming a hyperblock of instructions by merging $BB_i$ and $BB_x$ (the BB most likely to follow $BB_i$ in the order of execution.)

In block 214, the Translator determines the probability (P) of the $BB_i$'s branch instruction being taken by dividing $BB_i$'s taken counter with $BB_i$'s used counter. In conditional block 216, it is determined whether the branch instruction of $BB_i$ is strongly taken, strongly not taken, or something in between ("flaky"). The probability of $BB_i$'s branch being taken is compared to a strongly taken threshold (TAKEN) and a strongly not taken threshold (NOT-TAKEN).

In one embodiment, the strongly taken threshold is 90% and the strongly not taken threshold is 10%. In alternative embodiments, the actual numbers of the strongly taken and strongly not taken thresholds can be different levels, including being represented as non-additive inverses. If both conditions in block 216 fail, the branch behavior of $BB_i$ is considered to be flaky, and the Translator is exited in block 236 to continue execution of the program at $BB_j$ in block 240.

Provided one of the conditions of block 216 is true (i.e., the branch is predicted to be strongly taken or strongly not taken), in block 218 the $BB_x$ is determined. If the probability of taking $BB_i$'s branch instruction exceeds the strongly taken threshold, in block 220, $BB_x$ is the BB addressed by the conditional branch instruction of $BB_i$. Otherwise, in block 222, $BB_x$ is the BB following $BB_i$ next in the static sequence of the Untranslated Program.

In block 224, $BB_i$ and $BB_x$, are translated into instructions executable in the target instruction set computer architecture by the Translator. The Translator sequentially performs a binary translation of the instructions included in $BB_i$ and $BB_x$. During the binary translation, each instruction is decoded by the Translator into an opcode and operands. The opcode indicates an operation to be performed by the instruction, and the operands are memory or register addresses of data to be operated on by the opcode.

The Translator further provides a separate sequence of micro-instructions in place of the untranslated instruction's opcode in order to emulate execution the untranslated instruction on the target system. The micro-instructions provided by the Translator are selected from the instruction set of the target computer system.

The Translator also translates the memory addresses of the untranslated instruction's operands to be compatible with the target computer system. For example, the memory addresses, which typically represent memory or register locations in the source computer system, may be added to an offset base memory address of the target computer system.

In alternative embodiments, if $BB_i$ and $BB_x$ were previously translated, memory addresses of the translated $BB_i$ and $BB_x$ could be retrieved from the Translated Address Table and used in place of retranslating the instructions.

In block 228, the Translator begins forming the hyperblock of instructions 182 by storing the translated instructions of $BB_i$ and $BB_x$ adjacent to each other, in the order of execution, in the Translated Hyperblocks memory location 190. For example, as shown in FIG. 1, $BB_1$ and $BB_3$ are stored adjacent to each other in the hyperblock 182. The Translated Hyperblocks memory location may alternatively be in a cache memory of a processor. The Increment & Select Code of $BB_i$ and $BB_x$ may be omitted from the hyperblock.

In block 230, the instructions within the hyperblock are scheduled to accommodate data and resource dependencies through standard optimization and scheduling procedures.

In block 232, the Translator replaces $BB_i$ s address in a Translated Address Table 150, with the address for the hyperblock 182. In one embodiment, each row of the Translated Address Table includes an identifier associated with a translated BB and a memory address corresponding to the translated BB (e.g. the hyperblock).

When processing the program, an identifier associated with a BB is issued from a processor to the Translated Address Table. The identifier from the processor is compared with each identifier in the table. When a match is found, the memory address corresponding to the translated BB is returned to the processor. Subsequently, the instructions stored at the memory address (e.g. the hyperblock) are fetched and issued to an execution unit of the processor and executed.

In block 234, the Translator continues at block 214. During the succeeding iteration, the probability of taking $BB_x$'s branch instruction is determined in processing block 214. The method of the present invention will continue to build the hyperblock by performing the steps described in blocks 214 through 234.

Once a particular BB$_x$ fails both conditions of block 216, wherein the particular BB$_x$ branch behavior is found to be flaky, the Translator, in block 236, is exited and the address for BB$_j$ is returned so that in block 240 the execution of the computer program can be resumed at BB$_j$.

The hyperblock, however, remains in memory to be executed the next time BB$_i$ is called during the present processing of the program. Regardless of whether the behavior of the branch instructions of the BBs merged to form the hyperblock is different from the expected order of execution, the hyperblock is retained for future execution.

While the method of the present invention has been described in connection with certain embodiments and examples, it should be understood that the broad concept embodied in the invention is not limited to these embodiments.

For instance, the present invention may be performed dynamically during the execution of a computer program, wherein the taken and used counters are used to generate an "expected" order of execution based on input data presently being processed. Alternatively, the present invention may be performed statically when the program is not being executed, wherein the order of execution can be based on assuming all forward conditional branch instructions or all backward conditional branch instructions are taken.

In addition, where it has been shown that the Translator, the Counter Table, the Translated Address Table, the Translated hyperblocks, the untranslated Source Program, and the Translated Basic Blocks are stored in memory, these items and instructions can also be stored on other computer-readable mediums, including magnetic and optical disks, which could be accessed via the disk drive shown in the computer system of FIG. 1. Alternatively, the Translator could be implemented in discrete hardware components such as large-scale integrated circuits (LSI's), application-specific integrated circuits (ASIC's) or in firmware such as electrically erasable programmable read-only memory (EEPROM's).

What is claimed is:

1. A method for use in a computer system, the computer system having a translator for translating instructions executable in a source instruction set Architecture into instructions executable in a target instruction set Architecture, the method comprising the steps of:
   a) the translator determining a probability of a first block of instructions following an order of execution to a second block of instructions, said probability consisting of a ratio of a taken counter and a used counter, said taken counter represents a number of times the first block of instructions follows the order of execution to the second block of instructions, and said used counter a number of times the first block of instructions has been executed; and
   b) in response to the probability exceeding a predetermined threshold, the translator generating a hyperblock of instructions representing the first and second block of instructions translated, and combined in the order of execution.

2. The method of claim 1, wherein the step of generating the hyperblock further includes the step of:
   c) replacing an address for the first block of instructions in an address table with an address of the hyperblock.

3. The method of claim 2, further includes the step of:
   d) in response to the probability being below a second threshold, generating by the translator a hyperblock representing the first block of instructions translated and a third block of instructions translated placed adjacent in a memory location, wherein the first and third block of instructions are adjacent in the physical static sequence of the first set of instructions.

4. The method of claim 3, further includes the following steps prior to the step of determining the order of execution:
   e) determining if the used counter exceeds a predetermined used-threshold;
   f) in response to the used counter exceeding the predetermined used-threshold, determining by the translator the order of execution from the first block of instructions to the second block of instructions.

5. The method of claim 4, further includes the following steps prior to the step of determining if the used counter exceeds the predetermined used-threshold:
   g) determining if a branch instruction of the first block of instructions is taken during a present execution of the first block of instructions;
   h) in response to the branch instruction of the first block of instructions being taken, incrementing the taken counter.

6. The method of claim 5, wherein the used counter and the taken counter are accumulated by instructions included in the first block of instructions translated.

7. The method of claim 1, wherein the steps of the method are performed dynamically during an execution of the first set of instructions.

8. A machine-readable medium having stored thereon data representing a first set of instructions a translator for translating instructions executable on a source instruction set architecture into instructions executable on a target instruction set architecture, the second set of instruction which, when executed by a processor, cause the processor to perform the steps of:
   a) the translator determining a probability of a first block of instructions following an order of execution to a second block of instructions, said probability consisting of a ratio of a taken counter and a used counter, said taken counter represents a number of times the first block of instructions follows the order of execution to the second block of instructions, and said used counter a number of times the first block of instructions has been executed; and
   b) in response to the probability exceeding a predetermined threshold, the translator generating a hyperblock of instructions representing the first and second block of instructions translated, and combined in the order of execution.

9. The machine-readable medium of claim 8, wherein the step of generating the hyperblock further includes the step of:
   c) replacing an address for the first block of instructions in an address table with an address of the hyperblock.

10. The machine-readable medium of claim 9, wherein said first set of instructions further includes additional instructions, which when executed by said processor, cause said processor to perform the additional step of:
    d) in response to the probability being below a second threshold, generating by the translator a hyperblock representing the first block of instructions translated and a third block of instructions translated placed adjacent in a memory location, wherein the first and third block of instructions are adjacent in the physical static sequence of the first set of instructions.

11. The machine-readable medium of claim 10, wherein said first set of instructions further includes additional instructions, which when executed by said processor, cause said processor to perform the following steps prior to the step of determining the order of execution:

e) determining if the used counter exceeds a predetermined used-threshold;

f) in response to the used counter exceeding the predetermined used-threshold, determining by the translator the order of execution from the first block of instructions to the second block of instructions.

12. The machine-readable medium of claim 11, wherein said first set of instructions further includes additional instructions, which when executed by said processor, cause said processor to perform the following steps prior to the step of determining if the used counter exceeds the predetermined used-threshold:

g) determining if a branch instruction of the first block of instructions is taken during a present execution of the first block of instructions;

h) in response to the branch instruction of the first block of instructions being taken, incrementing the taken counter.

13. The machine-readable medium of claim 12, wherein the used counter and the taken counter are accumulated by instructions included in the first block of instructions translated.

14. The machine-readable medium of claim 13, wherein the steps are performed dynamically during an execution of the first set of instructions.

15. A translator to translate instructions executable in a source instruction set Architecture into instructions executable in a target instruction set Architecture, said translator comprising:

a first device to determine a probability of a first block of instructions following an order of execution to a second block of instructions, said probability consisting of a ratio of a taken counter and a used counter, said taken counter represents a number of times the first block of instructions follows the order of execution to the second block of instructions, and said used counter a number of times the first block of instructions has been executed; and a second device to generate a hyperblock of instructions in response to the probablity exceeding a predetermined threshold, the hyperblock of instructions representing the first block of instructions translated and second block of instructions translated, and combined in the order of execution.

16. The translator of claim 15, wherein the generating of the hyperblock by said second device further includes replacing an address for the first block of instructions in an address table with an address of the hyperblock.

17. The translator of claim 16, wherein in response to the probability being below a second threshold, said translator generates a hyperblock representing the first block of instructions translated and a third block of instructions translated placed adjacent in a memory location, wherein the first and third block of instructions are adjacent in the physical static sequence of the first set of instructions.

* * * * *